US012763330B2

(12) United States Patent
Takeshita

(10) Patent No.: US 12,763,330 B2
(45) Date of Patent: Oct. 13, 2026

(54) NEGATIVE ELECTRODE ACTIVE MATERIAL, SECONDARY BATTERY, AND METHOD FOR PRODUCING ARTIFICIAL GRAPHITE PARTICLES

(71) Applicant: PRIME PLANET ENERGY & SOLUTIONS, INC., Tokyo (JP)

(72) Inventor: Shuhei Takeshita, Nagakute (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 647 days.

(21) Appl. No.: 18/139,064

(22) Filed: Apr. 25, 2023

(65) Prior Publication Data

US 2023/0387411 A1 Nov. 30, 2023

(30) Foreign Application Priority Data

Apr. 26, 2022 (JP) ................................ 2022-072357

(51) Int. Cl.
*H01M 4/587* (2010.01)
*C01B 32/205* (2017.01)
*H01M 4/02* (2006.01)

(52) U.S. Cl.
CPC ........... *H01M 4/587* (2013.01); *C01B 32/205* (2017.08); *C01B 2204/22* (2013.01);
(Continued)

(58) Field of Classification Search
CPC .. H01M 4/587; C01B 32/205; C01B 2204/22; C01P 2002/72; C01P 2002/82; C01P 2006/40
See application file for complete search history.

(56) References Cited

U.S. PATENT DOCUMENTS

2014/0205532 A1 7/2014 Takeuchi et al.
2014/0335428 A1 11/2014 Wakizaka et al.
(Continued)

FOREIGN PATENT DOCUMENTS

CN 115838170 A 3/2023
JP 08-217433 A 8/1996
(Continued)

OTHER PUBLICATIONS

An Integrated Imaging Study of the Pore Structure of the Cobourg Limestone—A Potential Nuclear Waste Host Rock in Canada NPL by Hu et al (Year: 2021).*
(Continued)

*Primary Examiner* — Jimmy Vo
(74) *Attorney, Agent, or Firm* — Finnegan, Henderson, Farabow, Garrett and Dunner, LLP

(57) ABSTRACT

A negative electrode active material capable of suppressing expansion of a negative electrode is provided. The negative electrode active material disclosed herein includes artificial graphite particles having a plurality of internal voids. The artificial graphite particles have a porosity of 0.7 to 15%. When binarization is performed on a cross-sectional electron microscopic image of 10 or more of the artificial graphite particles arbitrarily selected, circular approximation is then performed on internal voids having cross-sectional areas of 1000 $nm^2$ or more, and circularities of 20 or more of the internal voids arbitrarily selected in each particle are determined, the internal voids have an average circularity of 0.1 to 0.6.

7 Claims, 6 Drawing Sheets

(52) U.S. Cl.
CPC ...... *C01P 2002/72* (2013.01); *C01P 2002/82* (2013.01); *C01P 2006/40* (2013.01); *H01M 2004/021* (2013.01); *H01M 2004/027* (2013.01)

(56) References Cited

U.S. PATENT DOCUMENTS

| | | | | |
|---|---|---|---|---|
| 2017/0187041 | A1* | 6/2017 | Yamada ................ | H01M 4/583 |
| 2017/0373314 | A1 | 12/2017 | Takeda | |
| 2020/0411843 | A1 | 12/2020 | Song et al. | |

FOREIGN PATENT DOCUMENTS

| | | | | |
|---|---|---|---|---|
| JP | 4421750 | B2 | | 2/2010 |
| JP | 2013-201104 | A | | 10/2013 |
| JP | 2014-053154 | A | | 3/2014 |
| JP | 2014-053314 | A | | 3/2014 |
| JP | 2018139171 | A | * | 9/2018 |
| JP | 66-25336 | B2 | | 12/2019 |
| KR | 10-2018-0083155 | A | | 7/2018 |
| KR | 10-2019-0044397 | A | | 4/2019 |
| WO | WO 2013/058349 | A1 | | 4/2013 |
| WO | WO 2016/121585 | A1 | | 8/2016 |

OTHER PUBLICATIONS

JP_2018139171_A_H Translation (Year: 2018).*

Sugimoto et al., "The effect of sulfur evolution on the properties of high-temperature carbons-I. Thianthrene and thianthrene-anthracene precursors," Carbon, Elsevier Oxford, GB, vol. 23, No. 4, Jan. 1, 1985, pp. 411-416.

Fujimoto et al., "Mechanism of puffing and the role of puffing inhibitors in the graphitization of electrodes from needle cokes," Carbon, Elsevier Oxford, GB, vol. 27, No. 6, Jan. 1, 1989, pp. 909-917.

* cited by examiner

NEGATIVE ELECTRODE ACTIVE MATERIAL, SECONDARY BATTERY, AND METHOD FOR PRODUCING ARTIFICIAL GRAPHITE PARTICLES

TECHNICAL FIELD

The present disclosure relates to a negative electrode active material including artificial graphite particles. The present disclosure also relates to a secondary battery using the negative electrode active material. The present disclosure also relates to a method for producing the artificial graphite particles. This application claims the benefit of priority to Japanese Patent Application No. 2022-072357 filed on Apr. 26, 2022. The entire contents of this application are hereby incorporated herein by reference.

BACKGROUND

In recent years, secondary batteries such as lithium ion secondary batteries are suitably used for, for example, portable power supplies for devices such as personal computers and portable terminals, and power supplies for driving vehicles such as battery electric vehicles (BEVs), hybrid electric vehicles (HEVs), and plug-in hybrid electric vehicles (PHEVs).

Electrodes of secondary batteries, especially lithium ion secondary batteries, use active materials capable of absorbing and desorbing ions serving as charge carriers. The active material expands and contracts with absorption and desorption of these ions, and thus, the volume of the electrode changes in charging and discharging the secondary battery. In secondary batteries, suppression of this volume change of electrodes have been an issue for many years. To address this issue, Patent Document 1 proposes to suppress expansion of a negative electrode in the thickness direction by orienting a graphite layer perpendicularly to a negative electrode current collector to some degree.

CITATION LIST

Patent Reference

Patent Document 1: Japanese Patent No. 6625336

However, the conventional technique described above does not suppress expansion of graphite particles themselves, and therefore, cannot suppress the volume change of the negative electrode fundamentally.

It is therefore an object of the present disclosure to provide a negative electrode active material capable of suppressing expansion of a negative electrode.

A negative electrode active material (1) disclosed herein includes artificial graphite particles having a plurality of internal voids. The artificial graphite particles have a porosity of 0.7 to 15%. When binarization is performed on a cross-sectional electron microscopic image of 10 or more of the artificial graphite particles arbitrarily selected, circular approximation is then performed on internal voids having cross-sectional areas of 1000 $nm^2$ or more, and circularities of 20 or more of the internal voids arbitrarily selected in each particle are determined, the internal voids have an average circularity of 0.1 to 0.6. This configuration provides a negative electrode active material capable of suppressing expansion of the negative electrode.

In a negative electrode active material (2) disclosed herein, the artificial graphite particles have a porosity of 8 to 15% in the negative electrode active material (1). This configuration further suppresses expansion of the negative electrode.

In a negative electrode active material (3) disclosed herein, the internal voids have an average circularity of 0.3 to 0.6 in the negative electrode active material (1) or (2). This configuration further suppresses expansion of the negative electrode.

In a negative electrode active material (4) disclosed herein, a ratio ($I_G/I_D$) of a G band peak intensity ($I_G$) to a D band peak intensity ($I_D$) of the artificial graphite particles determined by Raman spectroscopy is 1.5 to 60 in any one of the negative electrode active materials (1) to (3). In this configuration, the internal voids are oriented in parallel with the graphite layer, and expansion of the negative electrode is further suppressed. In addition, the capacity increases.

In a negative electrode active material (5) disclosed herein, an interplanar distance $d_{002}$ of a (002) plane of graphite crystal of the artificial graphite particles determined by a powder X-ray diffraction analysis is 3.36 Å to 3.38 Å in any one of the negative electrode active materials (1) to (4). In this configuration, the internal voids are oriented in parallel with the graphite layer, and expansion of the negative electrode is further suppressed.

In another aspect, a secondary battery (6) disclosed herein includes: a positive electrode; a negative electrode; and an electrolyte. The negative electrode includes any one of the negative electrode active materials (1) to (5). This configuration provides a secondary battery in which expansion of the negative electrode is suppressed.

In yet another aspect, a method for producing artificial graphite particles (7) disclosed herein includes heating a graphite precursor from 1000° C. to 2600° C. or more within five hours to graphitize the graphite precursor. A sulfur concentration in the graphite precursor is 0.4% or more and 7% or less. This configuration can produce a negative electrode active material capable of suppressing expansion of the negative electrode.

A method for producing artificial graphite particles (8) disclosed herein, the graphite precursor is heated from 1000° C. to 2800° C. or more within five hours to graphitize the graphite precursor in the production method (7). This configuration is more advantageous in producing a negative electrode active material capable of suppressing expansion of the negative electrode.

In a method for producing artificial graphite particles (9) disclosed herein, the heating is performed by high-frequency induction heating in the production method (7) or (8). This configuration enables heating at a significantly high temperature rise rate.

DETAILED DESCRIPTION OF THE PREFERRED EMBODIMENT

Figure 1:
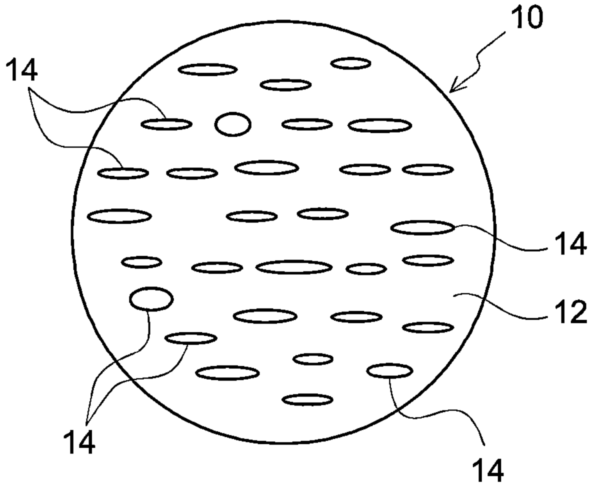
FIG. 1 is a schematic cross-sectional view of an example of artificial graphite particles included in a negative electrode active material according to one embodiment of the present disclosure.

Embodiments of the present disclosure will be described hereinafter with reference to the drawings. Matters not specifically mentioned herein but required for carrying out the present disclosure can be understood as matters of design of a person skilled in the art based on related art in the field. The present disclosure can be carried out on the basis of the contents disclosed in the description and common general knowledge in the field. In the drawings, members and parts having the same functions are denoted by the same reference characters for description. Dimensional relationships (e.g., length, width, and thickness) in the drawings do not reflect actual dimensional relationships. A numerical range expressed as "A to B" herein includes A and B.

A "secondary battery" herein refers to a power storage device capable of being repeatedly charged and discharged, and includes a so-called storage battery and a power storage element such as an electric double layer capacitor. A "lithium ion secondary battery" herein refers to a secondary battery that uses lithium ions as charge carriers and performs charge and discharge by movement of charges accompanying lithium ions between positive and negative electrodes.

A negative electrode active material according to this embodiment includes artificial graphite particles having a plurality of internal voids. The artificial graphite particles have a porosity of 0.7 to 15%. In a case where binarization is performed on a cross-sectional electron microscopic image of 10 or more of the artificial graphite particles arbitrarily selected, circular approximation is then performed on internal voids having cross-sectional areas of 1000 $nm^2$ or more, and circularities of 20 or more of the internal voids arbitrarily selected in each particle are determined, the internal voids have an average circularity of 0.1 to 0.6.

FIG. 1 is an illustration for a concept of artificial graphite particles included in the negative electrode active material according to this embodiment, and is a schematic cross-sectional view of an example of the artificial graphite particles. As illustrated in FIG. 1, artificial graphite particles 10 include a graphite portion 12 and a plurality of internal voids 14. In the artificial graphite particles 10, the plurality of internal voids 14 are present as independent voids. As can be understood from the provision that an average circularity is determined by using 20 or more of internal voids, the number of internal voids 14 included in one artificial graphite particle 10 is 20 or more.

In FIG. 1, each of the internal voids 14 is an ellipse. The shape of each internal void 14, however, is not limited thereto. The internal void 14 may be, for example, an approximate rectangle or an indefinite shape. The position, number, and the like of the internal voids 14 are not limited to the examples illustrated in FIG. 1.

In regard to the amount of the internal voids 14, a porosity of the particles is used as an index. In this embodiment, the artificial graphite particles 10 has the internal voids 14 in such an amount that the artificial graphite particles 10 have a porosity of 0.7 to 15%. Artificial graphite obtained by graphitization of a graphite precursor generally has no internal voids.

In regard to the shape of the internal voids 14, circularity of a figure is used as an index. The circularity is a value calculated by $4\pi S/L^2$ (where S is an area of a figure, and L is a perimeter of the figure). A perfect circle has a circularity of one, and it means that as the circularity decreases, the figure gradually deviates from the perfect circle. In this embodiment, circular approximation is performed on internal voids 14 having cross-sectional areas of 1000 $nm^2$ or more. In the expression of circularity, S is an area of internal voids 14 subjected to circular approximation, and L is a perimeter of the internal voids 14 subjected to circular approximation. Since the internal voids 14 are subjected to the circular approximation, as the circularity decreases, the internal voids 14 approach flat. In this embodiment, the average circularity is 0.1 to 0.6.

The artificial graphite particles 10 according to this embodiment have a specific amount of internal voids 14 having a specific circularity, whereby expansion of the negative electrode using the artificial graphite particles 10 can be suppressed. This is supposed to be because of the following reasons.

When lithium ions are inserted between graphite layers of graphite particles due to charging, an interplanar distance of graphite crystal expands, and accordingly, graphite particles expand. Since the artificial graphite particles 10 include a specific amount of internal voids 14 having a specific circularity, the expansion of the interplanar distance of graphite crystal can be thereby absorbed. In particular, since the circularity of internal voids subjected to circular approximation is within a predetermined range (i.e., the internal voids have an elongated shape) in this example, the expansion of the interplanar distance of graphite crystal is easily absorbed. Thus, a change in the volume of the artificial graphite particles 10 can be effectively reduced. Consequently, the expansion of the negative electrode using the artificial graphite particles 10 can be suppressed.

From the viewpoint of further suppressing the expansion of the negative electrode using the artificial graphite particles 10, the porosity of the artificial graphite particles 10 is desirably 8 to 15%. It should be noted that the porosity is determined as a percentage (%) of the total area of internal voids with respect to the area of the entire particle in a cross-sectional electron micrograph of the artificial graphite particles 10.

Specifically, the porosity can be determined in the following manner, for example. A material or a member (e.g., negative electrode active material layer of a negative electrode) including artificial graphite particles is subjected to ion milling so that a cross section of the material or the member is exposed. A scanning electron microscopic (SEM) image of this cross section is obtained, and in this SEM image, a graphite portion and void portions are made distinct with image analysis software and are subjected to binarization. The area of the graphite portion and the area of the void portions are determined, and [(void portion total area)/{(graphite portion area)+(void portion total area)}]×100 is calculated. This value is obtained for 10 or more particles, and an average of these values is used as a porosity.

From the viewpoint of further suppressing the expansion of the negative electrode using the artificial graphite particles 10, the circularity of the artificial graphite particles 10 is desirably 0.3 to 0.6, and more desirably 0.45 to 0.6. It should be noted that the circularity can be determined in the following manner, for example. A material or a member (e.g., negative electrode active material of a negative electrode) including artificial graphite particles is subjected to ion milling so that a cross section of the material or the member is exposed. An SEM image of this cross section is obtained, and in this SEM image, a graphite portion and void portions are made distinct with image analysis software and are subjected to binarization. Internal voids having cross-sectional areas of 1000 $nm^2$ or more are extracted, and subjected to circular approximation. Circularities of 20 or more internal voids arbitrarily selected are determined. This process is performed on 10 or more graphite particles arbitrarily selected, and an average thereof is calculated.

As the image analysis software for calculating a porosity and a circularity, "Image J" distributed by National Institutes of Health can be used, for example.

In the example illustrated in FIG. 1, the internal voids 14 are oriented in a predetermined direction. The internal voids 14, however, do not need to be oriented in a predetermined direction. In order to efficiently absorb the expansion of the interplanar distance of graphite crystal in the artificial graphite particles 10, the internal voids 14 are desirably oriented in parallel with a graphite layer (i.e., a graphene plane). Here, in a case where the artificial graphite particles 10 have high crystallinity, the major axis of each internal void 14 subjected to circular approximation can be oriented in parallel with the graphite layer.

The crystallinity of the artificial graphite particles 10 can be evaluated by using a ratio ($I_G/I_D$) of a G band peak intensity ($I_G$) to a D band peak intensity ($I_D$) determined by Raman spectroscopy. The ratio ($I_G/I_D$) is desirably 1.5 or more because crystal growth sufficiently progresses so that internal voids sufficiently develop and are highly oriented in the direction in which the graphite layer extends in the artificial graphite particles 10. On the other hand, the ratio ($I_G/I_D$) is desirably 60 or less because defect sites that allow lithium ions to enter particles are appropriately formed so that the capacity of the negative electrode active material increases. It should be noted that the D band peak intensity ($I_D$) and the G band peak intensity ($I_G$) can be obtained as the intensities of peaks appearing around 1360 $cm^{-1}$ and around 1580 $cm^{-1}$, respectively, in Raman spectroscopic measurement, using argon ion laser light, of the artificial graphite particles 10.

The crystallinity of the artificial graphite particles 10 can also be evaluated by using an interplanar distance $d_{002}$ of a (002) plane of graphite crystal of the artificial graphite particles 10. The interplanar distance $d_{002}$ is desirably within the range from 3.36 Å to 3.38 Å because crystal growth sufficiently progresses so that internal voids sufficiently develop and are highly oriented in the direction in which the graphite layer extends in the artificial graphite particles 10. It should be noted that the interplanar distance $d_{002}$ can be obtained by powder X-ray diffraction (XRD) measurement.

The average particle size (median particle size: D50) of the artificial graphite particles 10 is not specifically limited, and is, for example, 0.1 μm or more and 50 μm or less. Since the artificial graphite particles 10 are used for the negative electrode active material, the average particle size (D50) of the artificial graphite particles 10 is desirably 1 μm or more and 30 μm or less, and more desirably 5 μm or more and 20 μm or less. It should be noted that the average particle size (D50) of the artificial graphite particles 10 can be determined by, for example, a laser diffraction/scattering method.

Next, a method for producing artificial graphite particles included in the negative electrode active material according to this embodiment will be described. The artificial graphite particles included in the negative electrode active material according to this embodiment can be favorably produced in the following manner. It should be noted that the artificial graphite particles included in the negative electrode active material according to this embodiment are not limited to particles produced by the following method.

The method for producing artificial graphite particles included in the negative electrode active material according to this embodiment includes heating a graphite precursor from 1000° C. to 2600° C. or more within five hours to graphitize the graphite precursor. A sulfur concentration in the graphite precursor is 0.4% or more and 7% or less.

As the graphite precursor, a carbon material capable of being graphitized by heat treatment at 2600° C. or more can be used. Examples of the graphite precursor include coal (e.g., anthracite and bituminous coal), petroleum-based pitch, coal-based pitch, coal-based coke, petroleum-based coke, coal-based needle coke, petroleum-based needle coke, bulk mesophase, mesophase pitch carbon fibers, mesophase pitch, mesocarbon microbeads, and coke obtained by purification from vacuum residual oil generated in crude oil purification. These materials may be used alone or two or more of them may be used in combination. Among these materials, at least one material selected from the group consisting of coal, petroleum-based pitch, coal-based pitch, coal-based coke, petroleum-based coke, coal-based needle coke, and petroleum-based needle coke is desirable, and at least one material selected from the group consisting of coal, petroleum-based pitch, and petroleum-based coke is more desirable.

In the production method, a graphite precursor having a sulfur concentration of 0.4% or more and 7% or less is used. This graphite precursor is heated from 1000° C. to 2600° C. or more within five hours so as to be graphitized.

The graphite precursor starts transitioning to a graphite structure at 1000° C. or more. The graphite precursor is known to cause volume expansion called puffing during graphitization. This puffing causes quality degradation of artificial graphite such as a decrease in strength and occurrence of cracks. One of causes of puffing is considered to be because when a sulfur component included in the graphite precursor is decomposed at high temperature and vaporizes to the outside, this sulfur component expands micro structure of the graphite precursor. Thus, as a graphite precursor, a graphite precursor having a small sulfur concentration, specifically, a graphite precursor having a sulfur concentration of 0.35% or less (especially graphite precursor having a sulfur concentration less than 0.1% for application of a secondary battery) is generally used.

On the other hand, graphitization by heat treatment causes heat contraction. Thus, in general, in order to reduce the degree of this heat contraction, the temperature rise is performed for a long time (e.g., temperature rise is performed for several weeks for application of a secondary battery).

Figure 2A:
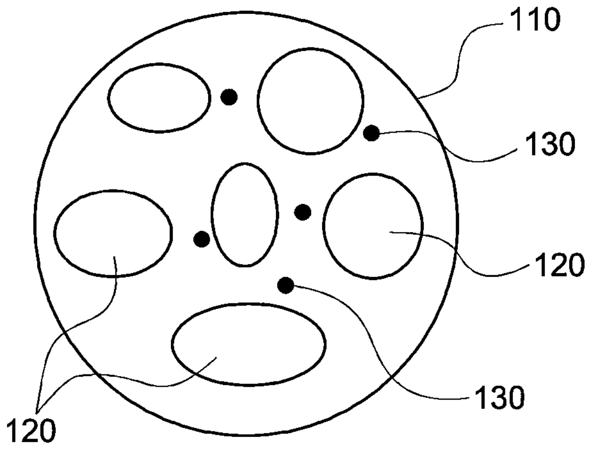
FIGS. 2A 2B and 2C are illustrations of a mechanism of generating internal voids in a production method according to one embodiment of the present disclosure.
Figure 2B:
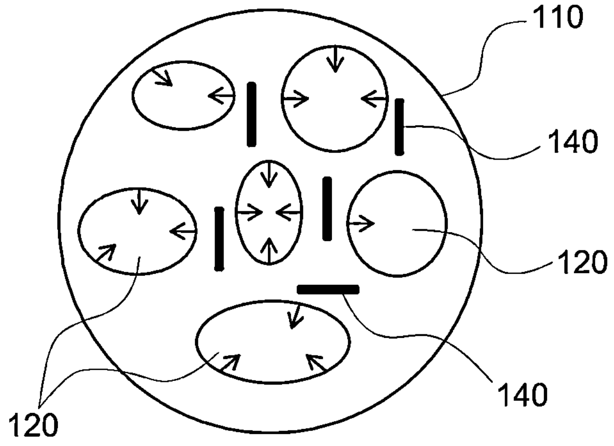
Figure 2C:
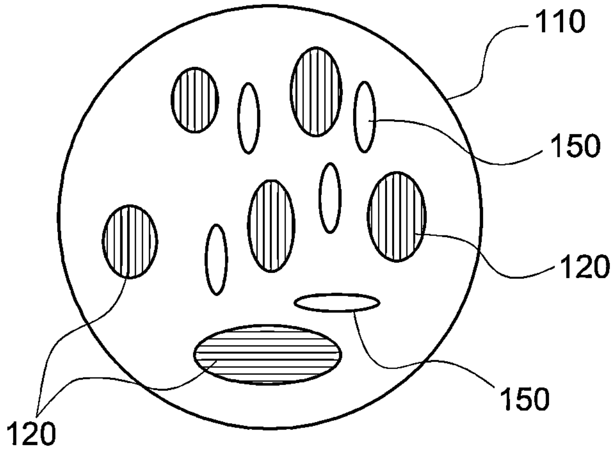

On the other hand, in the production method according to this embodiment, a graphite precursor having a high sulfur concentration is intentionally used and a temperature rise is intentionally performed in a short time. According to this process, artificial graphite particles having a porosity of 0.7 to 15% and the above-mentioned average circularity of internal voids of 0.1 to 0.6 can be efficiently obtained. A mechanism of generating such internal voids is assumed as follows. In FIGS. 2A, 2B and 2C, which will be described later, the number of internal voids is five for convenience of description and ease of understanding. In practice, 20 or more internal voids are generated.

FIG. 2A illustrates graphite precursor particles 110 as a raw material. The graphite precursor particles contain optical textures 120 serving as a core of crystal growth, and a sulfur component 130.

When the graphite precursor particles 110 are heated to 1500° C. or more, crystal growth of the optical textures 120 and desorption (i.e., desulfurization) of the sulfur component 130 occur at the same time. In crystal growth of the optical textures 120, contraction occurs toward the centers of the optical textures 120 (see the arrows in FIG. 2B). Consequently, as illustrated in FIG. 2B, cracks 140 occur in portions where the sulfur component 130 is desorbed.

Thereafter, crystal growth of the optical textures 120 continues such that the interplanar distance of the graphite structure contracts. Along with this, the cracks 140 expand and become internal voids 150. At this time, as illustrated in FIG. 2C, the internal voids 150 are oriented in parallel with the graphene plane, and the cross-sectional shape of each of the internal voids 150 becomes elongated. As described above, the elongated cross-sectional shape has a low circularity. In this manner, a large number of voids having an average circularity of 0.1 to 0.6 after the circular approximation are formed, and the porosity thereof is as high as 0.7 to 15%.

A graphite precursor having a sulfur concentration of 0.4% or more and 7% or less is known and available according to a known method. The sulfur concentration in the graphite precursor can be determined by combustion ion chromatography. The combustion ion chromatography can be performed according to a known method. Specifically, for example, a sample of a graphite precursor is placed in a combustion decomposition unit and burnt in a combustion gas flow including oxygen. The generated gas is collected in an absorbing solution, and sulfuric acid ions collected in the absorbing solution is separated and the quantity thereof is determined by ion chromatography. Based on the result, a sulfur concentration of the graphite precursor is determined. It should be noted that the unit "%" of the sulfur concentration herein means "mass %" according to the usual meaning in the field of artificial graphite.

For the purpose of obtaining uniform artificial graphite particles, for example, the graphite precursor may be subjected to pulverization, classification, and other treatments. Pulverization may be performed by using a known pulverization device (e.g., jet mill, hammer mill, roller mill, pin mill, or vibrating mill). Classification can be performed by using a known classification device.

Heating may be performed only on the graphite precursor. Alternatively, a mixture of the graphite precursor and other components may be heated within a range that does not significantly inhibit the effects of the present disclosure. For example, in producing an artificial graphite material, a binder pitch (e.g., pitch having a softening point of about 70 to 300° C.) is added in some cases. In this embodiment, a binder pitch may be added to the graphite precursor. In the case of adding a binder pitch, the type and amount of the binder pitch are desirably appropriately selected in consideration of the possibility of filling voids of the resulting artificial graphite particles.

In the production method according to this embodiment, the graphite precursor is heated from 1000° C. to 2600° C. or more within five hours so that the graphite precursor is graphitized. In order to achieve such a rapid temperature rise, heating is desirably performed by high-frequency induction heating or direct resistance heating.

The high-frequency induction heating is a heating method in which a conductive heating target is placed inside a heating coil, and an eddy current is induced in the heating target by allowing a high-frequency current to flow in the heating coil so that Joule heat is generated by resistance of the heating target so as to cause self-heating of the heating target. For example, a graphite precursor is placed in a carbon crucible, vessel, or mold, and heating by the high-frequency induction heating method can be performed using this as a heating target.

The direct resistance heating is a heating method in which an electric current is allowed to flow directly in a conductive heating target so that Joule heat is generated by resistance of the heating target so as to cause self-heating of the heating target. For example, a graphite precursor is placed in a carbon crucible, vessel, or mold, and heating by the direct energization heating method can be performed using this as a heating target.

Heating is more desirably performed by the high-frequency induction heating because of a higher temperature rise rate.

To avoid adverse effects from an atmosphere, heating is desirably performed under an inert atmosphere (e.g., atmosphere of an inert gas such as an argon gas), but the atmosphere is not limited to this.

The temperature rise rate is not specifically limited as long as heating can be performed from 1000° C. to 2600° C. or more within five hours. The temperature rise rate is desirably 10° C./min. or more, more desirably 20° C./min or more, and even more desirably or more.

From the viewpoint of further enhancing crystallinity of the resulting artificial graphite particles, heating is desirably performed from 1000° C. to 2800° C. or more within five hours, and more desirably performed from 1000° C. to 2800° C. or more within three hours. It should be noted that if the heating temperature is excessively high, sublimation of graphite may occur, and energy consumption for heating increases. In view of this, the maximum temperature of this heating is desirably 3500° C. or less, and more desirably 3200° C. or less.

Conditions for the temperature rise of the graphite precursor to 1000° C. are not specifically limited. A predetermined heat treatment may be performed on the graphite precursor at a temperature less than 1000° C. The temperature rise rate from room temperature to 1000° C. may be equal to, or different from, the temperature rise rate from 1000° C. to 2600° C. or more.

In order to progress sufficient graphitization, the graphite precursor may be heated to 2600° C. or more and then held at the same temperature for a predetermined time. The holding time is, for example, 30 minutes or more. The holding time may be 24 hours or less, 12 hours or less, 6 hours or less, or 3 hours or less.

This heating can graphitize the graphite precursor. After the heating, the resultant may be left to cool. That is, the resultant may be allowed to cool (i.e., subjected to natural cooling).

In the foregoing manner, the artificial graphite particles according to this embodiment can be obtained. With this production method, the porosity of the artificial graphite particles and the average circularity of the internal voids can be controlled by adjusting the sulfur concentration of the graphite precursor and conditions for the temperature rise.

A negative electrode can be fabricated according to a known method by using the negative electrode active material according to this embodiment. Specifically, it is sufficient to use the negative electrode active material according to this embodiment for a known negative electrode using a graphite-based negative electrode active material. Further, a secondary battery can be fabricated according to a known method by using the negative electrode. In the negative electrode including the negative electrode active material according to this embodiment, expansion of the negative electrode is suppressed.

In another aspect, a secondary battery according to this embodiment includes a positive electrode, a negative electrode, and an electrolyte, and the negative electrode includes the negative electrode active material according to the embodiment described above. A configuration example of the secondary battery according to this embodiment will be described hereinafter. The secondary battery of this configuration example is a flat square lithium ion secondary battery including a flat wound electrode body and a flat battery case. The configuration of the secondary battery according to this embodiment, however, is not limited to the following example.

Figure 3:
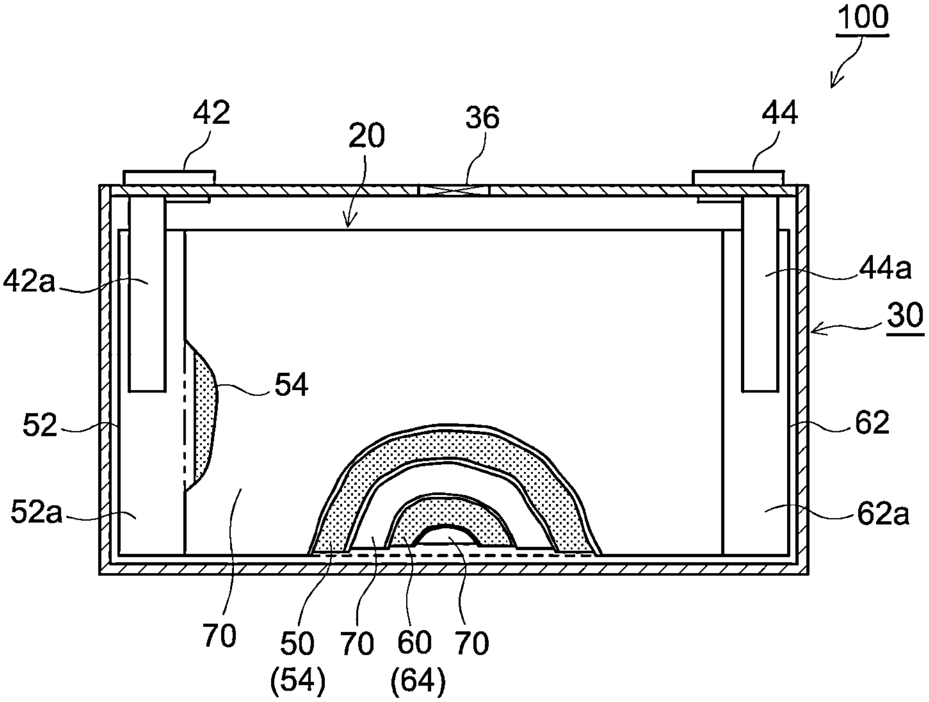
FIG. 3 is a cross-sectional view schematically illustrating a configuration of a lithium ion secondary battery using a negative electrode active material according to one embodiment of the present disclosure.

A lithium ion secondary battery 100 illustrated in FIG. 3 is a sealed battery in which a flat wound electrode body 20 and a nonaqueous electrolyte (not shown) are housed in a flat square battery case (i.e., an outer container) 30. The battery case 30 includes a positive electrode terminal 42 and a negative electrode terminal 44 for external connection, and a thin safety valve 36 configured to release the internal pressure when the internal pressure of the battery case 30 increases to a predetermined level or more. The positive and negative electrode terminals 42 and 44 are electrically connected to positive and negative electrode current collector plates 42*a* and 44*a*, respectively. A material for the battery case 30 is, for example, a metal material that is lightweight and has high thermal conductivity, such as aluminium.

Figure 4:
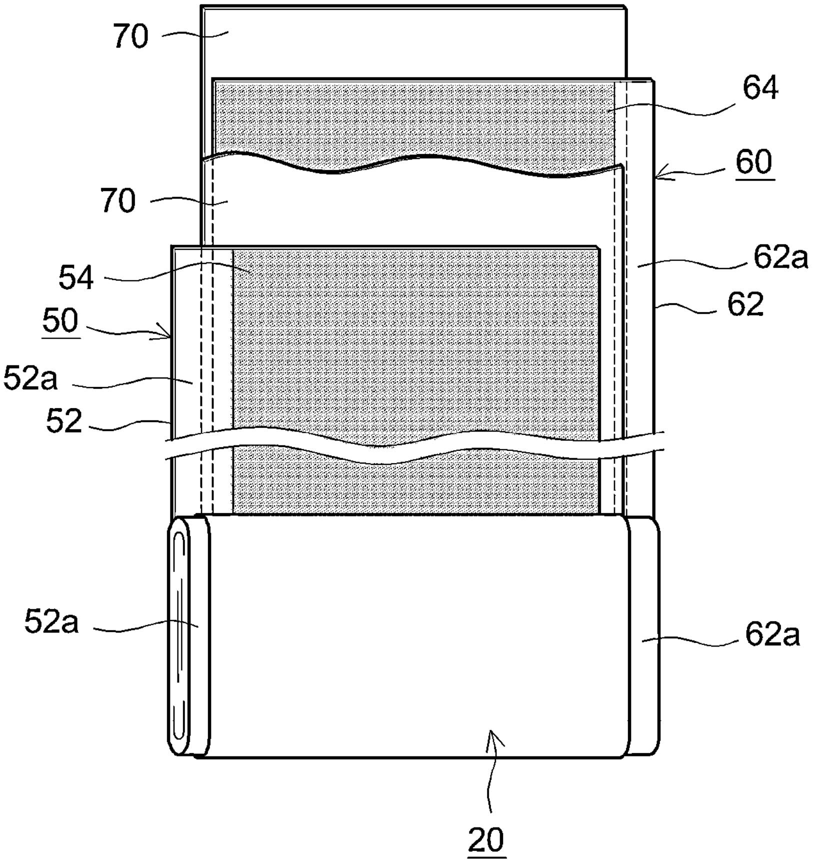
FIG. 4 is a schematic disassembled view illustrating a configuration of a wound electrode body of the lithium ion secondary battery illustrated in FIG. 3.

As illustrated in FIGS. 3 and 4, in the wound electrode body 20, a positive electrode sheet 50 and a negative electrode sheet 60 are stacked with two long separator sheets 70 interposed therebetween and wound in the longitudinal direction. In the positive electrode sheet 50, a positive electrode active material layer 54 is formed on one or each (each in this example) surface of an elongated positive electrode current collector 52 along the longitudinal direction. In the negative electrode sheet 60, a negative electrode active material layer 64 is formed on one or each (each in this example) surface of an elongated negative electrode current collector 62 along the longitudinal direction. A positive electrode active material layer non-formed portion 52*a* (i.e., a portion where no positive electrode active material layer 54 is formed and the positive electrode current collector 52 is exposed) and a negative electrode active material layer non-formed portion 62*a* (i.e., a portion where no negative electrode active material layer 64 is formed and the negative electrode current collector 62 is exposed) extend off outward from both ends of the wound electrode body 20 in the winding axis direction (i.e., the sheet width direction orthogonal to the longitudinal direction). A positive electrode current collector plate 42*a* and a negative electrode current collector plate 44*a* are respectively joined to the positive electrode active material layer non-formed portion 52*a* and the negative electrode active material layer non-formed portion 62*a*.

As the positive electrode current collector 52, a known positive electrode current collector for use in a lithium ion secondary battery may be used, and examples of the positive electrode current collector 52 include sheets or foil of highly conductive metals (e.g., aluminium, nickel, titanium, and stainless steel). The positive electrode current collector 52 is desirably aluminium foil.

Dimensions of the positive electrode current collector 52 are not specifically limited, and may be appropriately determined depending on battery design. In the case of using aluminium foil as the positive electrode current collector 52, the thickness thereof is not specifically limited, and is, for example, 5 μm or more and 35 μm or less, and desirably 7 μm or more and 20 μm or less.

The positive electrode active material layer 54 includes a positive electrode active material. Examples of the positive electrode active material include: lithium transition metal composite oxides such as lithium nickel composite oxide (e.g., $LiNiO_2$), lithium cobalt composite oxide (e.g., $LiCoO_2$), lithium nickel cobalt manganese composite oxide (e.g., $LiN_{1/3}Co_{1/3}Mn_{1/3}O_2$), lithium nickel cobalt aluminium composite oxide (e.g., $LiNi_{0.8}Co_{0.15}Al_{0.5}O_2$), lithium manganese composite oxide (e.g., $LiMn_2O_4$), and lithium nickel manganese composite oxide (e.g., $LiNi_{0.5}Mn_{1.5}O_4$); and lithium transition metal phosphate compounds (e.g., $LiFePO_4$).

The positive electrode active material layer 54 may include components other than the positive electrode active material, such as trilithium phosphate, a conductive material, and a binder. Desired examples of the conductive material include carbon black such as acetylene black (AB) and other carbon materials (e.g., graphite). Examples of the binder include polyvinylidene fluoride (PVDF).

The content of the positive electrode active material in the positive electrode active material layer 54 (i.e., content of the positive electrode active material with respect to the total mass of the positive electrode active material layer 54) is not specifically limited, and is desirably 70 mass % or more, more desirably 80 mass % or more, and even more desirably 85 mass % or more and 99 mass % or less. The content of trilithium phosphate in the positive electrode active material layer 54 is not specifically limited, and is desirably 0.1 mass % or more and 15 mass % or less, and more desirably 0.2 mass % or more and 10 mass % or less. The content of the conductive material in the positive electrode active material layer 54 is not specifically limited, and is desirably 0.1 mass % or more and 20 mass % or less, and more desirably 0.3 mass % or more and 15 mass % or less. The content of the binder in the positive electrode active material layer 54 is not specifically limited, and is desirably 0.4 mass % or more and 15 mass % or less, and more desirably 0.5 mass % or more and 10 mass % or less.

The thickness of the positive electrode active material layer 54 is not specifically limited, and is, for example, 10 μm or more and 300 μm or less, and desirably 20 μm or more and 200 μm or less.

As the negative electrode current collector 62, a known negative electrode current collector for use in a lithium ion secondary battery may be used, and examples of the negative electrode current collector include sheets or foil of highly conductive metals (e.g., copper, nickel, titanium, and stainless steel). The negative electrode current collector 62 is desirably copper foil.

Dimensions of the negative electrode current collector 62 are not specifically limited, and may be appropriately determined depending on battery design. In the case of using copper foil as the negative electrode current collector 62, the thickness thereof is not specifically limited, and is, for example, 5 μm or more and 35 μm or less, and is desirably 6 μm or more and 20 μm or less.

The negative electrode active material layer 64 includes, as a negative electrode active material, the negative electrode active material according to the embodiment described above. The negative electrode active material layer 64 may include another negative electrode active material in addition to the negative electrode active material according to the above embodiment within a range that does not significantly inhibit the effects of the present disclosure.

The negative electrode active material layer 64 can include components other than the active material, such as a binder or a thickener. Examples of the binder include styrene-butadiene rubber (SBR) and polyvinylidene fluoride (PVDF). Examples of the thickener include carboxymethyl cellulose (CMC).

The content of the negative electrode active material in the negative electrode active material layer 64 is desirably 90 mass % or more, and more desirably 95 mass % or more and 99 mass % or less. The content of the binder in the negative electrode active material layer 64 is desirably 0.1 mass % or more and 8 mass % or less, and more desirably 0.5 mass % or more and 3 mass % or less. The content of the thickener in the negative electrode active material layer 64 is desirably 0.3 mass % or more and 3 mass % or less, and more desirably 0.5 mass % or more and 2 mass % or less.

The thickness of the negative electrode active material layer 64 is not specifically limited, and is, for example, 10 μm or more and 300 μm or less, and desirably 20 μm or more and 200 μm or less.

Examples of the separator 70 include a porous sheet (film) of a resin such as polyethylene (PE), polypropylene (PP), polyester, cellulose, and polyamide. The porous sheet may have a single-layer structure or a laminated structure of two or more layers (e.g., three-layer structure in which PP layers are stacked on both surfaces of a PE layer). A heat-resistance layer (HRL) may be provided on a surface of the separator 70.

The thickness of the separator 70 is not specifically limited, and is, for example, 5 μm or more and 50 μm or less, and is desirably 10 μm or more and 30 μm or less.

A nonaqueous electrolyte typically includes a nonaqueous solvent and a supporting electrolyte (electrolyte salt). As the nonaqueous solvent, various organic solvents such as carbonates, ethers, esters, nitriles, sulfones, and lactones for use in an electrolyte of a typical lithium ion secondary battery can be used without any particular limitation. Among these solvents, carbonates are desirable, and specific examples of the carbonates include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). Such nonaqueous solvents may be used alone or two or more of them may be used in combination.

Desired examples of the supporting electrolyte include lithium salts (desirably $LiPF_6$) such as $LiPF_6$, $LiBF_4$, and lithium bis(fluorosulfonyl)imide (LiFSI). The concentration of the supporting electrolyte is desirable 0.7 mol/L or more and 1.3 mol/L or less.

The nonaqueous electrolyte may include components not described above, for example, various additives exemplified by: a film forming agent such as vinylene carbonate (VC) and an oxalato complex; a gas generating agent such as biphenyl (BP) or cyclohexylbenzene (CHB); and a thickener, to the extent that the effects of the present disclosure are not significantly impaired.

The lithium ion secondary battery 100 is applicable to various applications. Desired examples of application include driving power supplies to be mounted on vehicles such as electric vehicles (BEVs), hybrid electric vehicles (HEVs), and plug-in hybrid electric vehicles (PHEVs). The lithium ion secondary battery 100 can also be used as a storage battery for a small-size power storage device and the like. The lithium ion secondary battery 100 can also be used in a form of a battery pack in which a plurality of batteries are typically connected in series and/or in parallel.

The foregoing description is directed to the square lithium ion secondary battery 100 including the flat wound electrode body 20 as an example. Alternatively, the lithium ion secondary battery can also be configured as a lithium ion secondary battery including a stacked-type electrode body (i.e., electrode body in which a plurality of positive electrodes and a plurality of negative electrodes are alternately stacked). The lithium ion secondary battery may be configured as a cylindrical lithium ion secondary battery, a laminate-cased lithium ion secondary battery, or other types of batteries. The lithium ion secondary battery may also be configured as an all-solid-state lithium ion secondary battery using a solid electrolyte instead of a nonaqueous electrolyte according to a known method.

The negative electrode active material according to the embodiment described above is suitable as a negative electrode active material of a lithium ion secondary battery, but is also usable as a negative electrode active material of other secondary batteries. The other secondary batteries can be configured according to a known method. Thus, the secondary battery according to this embodiment can be configured as a secondary battery other than a lithium ion secondary battery according to a known method.

Examples of the present disclosure will now be described in detail, but are not intended to limit the present disclosure to these examples.

<Production of Negative Electrode Active Material>

Examples 1 to 6, Comparative Example 1

Petroleum-based cokes having different sulfur concentrations were prepared. Each petroleum-based coke was roughly pulverized to have a particle size of 10 mm or less with a hammer mill, and then further pulverized with a jet mill. The resulting pulverized material was classified with an airflow classifier, and thereby submicron-order fine powder generated by the pulverization was removed. In this manner, a graphite precursor was prepared. Table 1 shows the sulfur concentration of the graphite precursor. It should be noted that the sulfur concentration was measured by a method described later.

About 20 g of the graphite precursor was put into a carbon crucible, and the carbon crucible was placed in a combustion furnace of a high-frequency induction heating type. The atmosphere in this furnace was an argon atmosphere. Then, graphitization was performed such that the graphite precursor was heated to 3000° C. at a temperature rise rate of 50° C./min, and held at 3000° C. for one hour. Thereafter, heating was stopped, and graphitized substance was allowed to cool in the furnace. In this manner, artificial graphite particles (i.e., negative electrode active materials) of Examples 1 to 6 and Comparative Example 1 were obtained.

Comparative Example 2

As a graphite precursor, the same graphite precursor as that used in Example 3 was used. About 20 g of the graphite precursor was put into a carbon crucible, and was placed in an Acheson furnace. The atmosphere in this furnace was an argon atmosphere. Then, graphitization was performed such that the graphite precursor was heated to 3000° C. at a temperature rise rate of about 30° C./hour, and held at about 3000° C. for four days. Thus, in this heating, about four days were needed for a temperature rise to 2800° C. or more. Thereafter, heating was stopped, and graphitized substance was allowed to cool in the furnace. In this manner, artificial graphite particles (i.e., negative electrode active material) of Comparative Example 2 were obtained.

<Sulfur Concentration Measurement of Graphite Precursor>

As combustion equipment of a graphite precursor, a total organic halogen analyzer "TOX-100" manufactured by Mitsubishi Chemical Corporation was used. A sample in which 5 mg of the graphite precursor used in each of the examples and the comparative examples and 50 mg of a tungsten-based combustion improver were mixed was collected on a sample board (ceramic board). The sample was burnt under an oxygen airflow with the equipment described above. The heater temperature was 1100° C., and the heating time was 500 seconds. A sulfur component in the generated combustion gas was collected in 20 mL of an absorbing solution. It should be noted that the absorbing solution was prepared by adding a hydrogen peroxide solution to deionized water such that the concentration of the hydrogen peroxide was 5 μg/mL.

A quantitative analysis was performed on the absorbing solution with an ion chromatographic analyzer "ICS-5000" including a column "AS15" and a suppressor "AERS-500" (2 mm) and manufactured by Nippon Dionex K.K., and a sulfur concentration was determined. It should be noted that as an eluate/regenerant, a potassium hydroxide solution was used.

<Measurement of Average Particle Size>

With a commercially available laser diffraction particle size distribution analyzer, an average particle size (D50) of artificial graphite particles (negative electrode active material) of each of the examples and the comparative examples was determined. Table 1 shows the results.

<Raman Spectroscopic Measurement>

With commercially available Raman spectroscopy equipment, a ratio of a peak intensity ($I_G$) of G band around 1580 $cm^{-1}$ to a peak intensity ($I_D$) of D band around 1360 $cm^{-1}$ for the artificial graphite particles (negative electrode active material) of each of the examples and the comparative examples was determined. Table 1 shows the results.

<XRD Measurement>

With a commercially available X-ray diffractometer, an interplanar distance $d_{002}$ of a (002) plane of graphite crystal in the artificial graphite particles (negative electrode active material) of each of the examples and the comparative examples was determined. Table 1 shows the results.

<Production of Evaluation Half Cell>

The negative electrode active material (C) of each of the examples and the comparative examples, styrene-butadiene rubber (SBR) as a binder, and carboxymethyl cellulose (CMC) as a thickener were mixed in deionized water at a mass ratio of C:SBR:CMC=99:0.5:0.5, thereby preparing negative electrode active material layer slurry. This slurry was applied onto a surface of copper foil with a thickness of 10 μm and dried, and then roll-pressed, thereby preparing a negative electrode sheet. A thickness of the negative electrode sheet at this state was measured.

As a lithium electrode, metallic lithium foil was prepared. A separator sheet in which a ceramic particle layer (HRL) with a thickness of 4 μm was formed on a porous polyolefin layer with a thickness of 20 μm and a three-layer structure of PP/PE/PP was prepared. In a mixed solvent including ethylene carbonate (EC), dimethyl carbonate (DMC), and ethyl methyl carbonate (EMC) at a volume ratio of 3:3:4, $LiPF_6$ as a supporting electrolyte was dissolved at a concentration of 1.0 mol/L, thereby preparing a nonaqueous electrolyte.

The negative electrode sheet, the separator, and the metallic lithium foil were stacked. At this time, the HRL of the separator faced the negative electrode sheet. The resulting stacked body was housed and sealed in a battery case together with the nonaqueous electrolyte, thereby preparing coin half cell.

<SEM Observation Evaluation>

Figure 5:
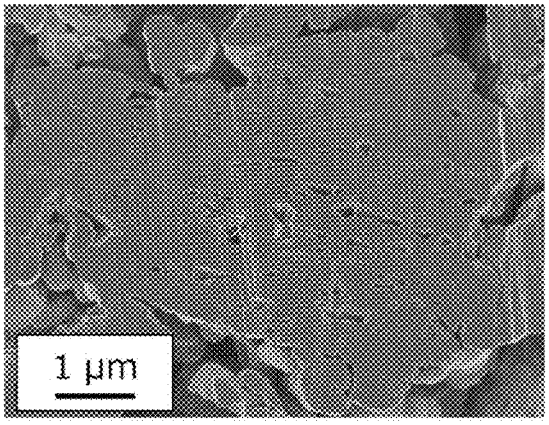
FIG. 5 is a scanning electron microscopic image of a cross section of artificial graphite particles obtained in Example 3.
Figure 6:
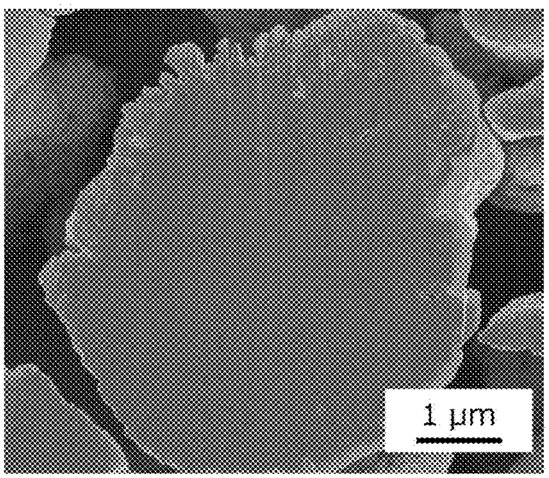
FIG. 6 is a scanning electron microscopic image of a cross section of artificial graphite particles obtained in Comparative Example 2.

The thus-produced negative electrode active material layer of the negative electrode was subjected to ion milling so that a cross section of the layer was exposed. The cross section was observed with a commercially available scanning electron microscope (SEM), and an SEM image was obtained. For reference, a cross-sectional SEM images of the artificial graphite particles of Example 3 and Comparative Example 2 are shown in FIGS. 5 and 6, respectively.

In the SEM images, a graphite portion and void portions were made distinct by using image analysis software "ImageJ" and subjected to binarization. For 10 or more particles, a porosity was obtained from the areas of the graphite portion and the void portions, and an average thereof was calculated. Table 1 shows the results.

Figure 7:
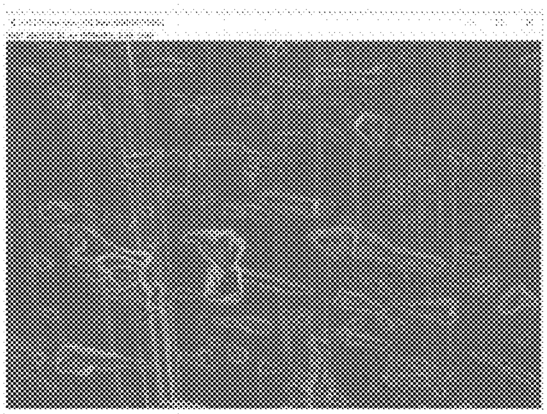
FIG. 7 is an image showing a result of binarization performed on a graphite portion and void portions in the image of FIG. 5.
Figure 8:
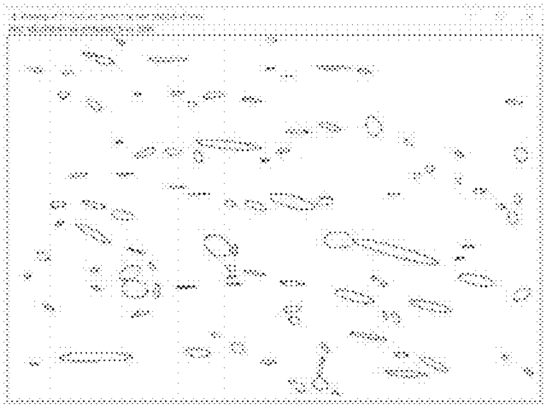
FIG. 8 is an image showing a result of extracting internal voids having cross-sectional areas of 1000 $nm^2$ or more and performing circular approximation on the internal voids in the image of FIG. 7.

Furthermore, with image analysis software "ImageJ," internal voids having cross-sectional areas of 1000 $nm^2$ or more were extracted from the graphite portion and the void portions subjected to the binarization, and circular approximation was performed on the extracted internal voids. For 10 or more particles, circularities of 20 or more internal voids were determined, and an average circularity was calculated. Table 1 shows the results. For reference, an image after binarization and an image after circular approximation in Example 3 are shown in FIGS. 7 and 8, respectively.

<Discharge Capacity Measurement>

Each of the evaluation half cells was subjected to constant-current charging to 3 V vs. Li electrode with a current value of 0.1 C and then subjected to constant-voltage charging to a current value of 1/10 C. Thereafter, each evaluation half cell was subjected to constant-current discharging to 1.6 V vs. Li electrode with a current value of 0.1 C and then subjected to constant-voltage discharging to a current value of 1/10 C. This charging/discharging cycle was repeated twice, and a discharge capacity (mAh) at the discharge in the second cycle was determined. From this discharge capacity and the weight of the negative electrode active material, a capacity density (mAh/g) of the negative electrode active material was calculated. Table 1 shows the results.

<Measurement of Negative Electrode Expansion Rate>

The thickness of the negative electrode sheet at fabrication measured as described above was defined as an initial thickness of the negative electrode. Each evaluation half cell was charged to a capacity value of 80% of the discharge capacity measured as described above. Thereafter, each evaluation half cell was disassembled, and the thickness of the negative electrode was measured and defined as the thickness of the negative electrode after charging. An expansion rate was determined by the equation below. Table 1 shows the results.

Expansion rate (%)=(thickness of negative electrode after charging/initial thickness of negative electrode)×100

TABLE 1

| | Precursor | | Artificial graphite particles | | | | | | Evaluation | |
|---|---|---|---|---|---|---|---|---|---|---|
| | Sulfur concentration (%) | Graphitized Temperature rise rate | Particle size (μm) | $I_G/I_D$ ratio | Interplanar distance $d_{002}$ (Å) | Presence/absence of internal voids | Porosity (%) | Average circularity | Capacity density (mAh/g) | Expansion rate (%) |
| Example 1 | 0.4 | 50° C./min. | 7.0 | 58.8 | 3.362 | present | 0.7 | 0.15 | 322 | 113 |
| Example 2 | 0.5 | 50° C./min. | 7.2 | 35.7 | 3.366 | present | 3.6 | 0.31 | 321 | 110 |
| Example 3 | 0.9 | 50° C./min. | 7.5 | 18.2 | 3.369 | present | 6.2 | 0.44 | 320 | 108 |
| Example 4 | 1.8 | 50° C./min. | 8.3 | 16.7 | 3.369 | present | 8.3 | 0.49 | 319 | 105 |
| Example 5 | 5.5 | 50° C./min. | 9.1 | 5.8 | 3.371 | present | 10.4 | 0.53 | 318 | 104 |
| Example 6 | 7.0 | 50° C./min. | 10.1 | 1.7 | 3.379 | present | 15.0 | 0.58 | 317 | 103 |
| Comparative Example 1 | 0.3 | 50° C./min. | 6.9 | 59.0 | 3.362 | absent | — | — | 317 | 119 |
| Comparative Example 2 | 0.9 | 30° C./hour | 7.0 | 38.5 | 3.369 | absent | — | — | 311 | 120 |

The results in Table 1 show that in a case where the artificial graphite particles have a porosity of 0.7 to 15% and the above-described average circularity of internal voids is within the range from 0.1 to 0.6, expansion of the negative electrode is significantly reduced. Thus, it can be understood that the negative electrode active material disclosed herein can suppress expansion of the negative electrode.

Specific examples of the present disclosure have been described in detail hereinbefore, but are merely illustrative examples, and are not intended to limit the scope of claims. The techniques described in claims include various modifications and changes of the above exemplified specific examples.

What is claimed is:

1. A negative electrode active material comprising:

artificial graphite particles, wherein the artificial graphite particles are primary particles each having a plurality of internal voids the artificial graphite particles have a porosity of 0.7 to 15%, and when binarization is performed on a cross-sectional electron microscopic image of 10 or more of the artificial graphite particles arbitrarily selected, circular approximation is then performed on internal voids having cross-sectional areas of 1000 $nm^2$ or more, and circularities of 20 or more of the internal voids arbitrarily selected in each particle are determined, the internal voids have an average circularity of 0.1 to 0.6.

2. The negative electrode active material according to claim 1, wherein the artificial graphite particles have a porosity of 8 to 15%.

3. The negative electrode active material according to claim 1, wherein the average circularity of the internal voids is 0.3 to 0.6.

4. The negative electrode active material according to claim 1, wherein a ratio ($I_G/I_D$) of a G band peak intensity ($I_G$) to a D band peak intensity ($I_D$) of the artificial graphite particles determined by Raman spectroscopy is 1.5 to 60.

5. The negative electrode active material according to claim 1, wherein an interplanar distance $d_{002}$ of a (002) plane of graphite crystal of the artificial graphite particles determined by a powder X-ray diffraction analysis is 3.36 Å to 3.38 Å.

6. A secondary battery comprising:

a positive electrode;

a negative electrode; and an electrolyte, wherein the negative electrode includes the negative electrode active material according to claim 1.

7. The negative electrode active material according to claim 1, wherein the primary particles consist only of artificial graphite.

* * * * *